(12) United States Patent
Greer et al.

(10) Patent No.: US 6,460,004 B2
(45) Date of Patent: Oct. 1, 2002

(54) METHOD AND APPARATUS FOR CALIBRATING A NON-CONTACT GAUGING SENSOR WITH RESPECT TO AN EXTERNAL COORDINATE SYSTEM

(75) Inventors: Dale R. Greer; Gregory A. Dale, both of Novi, MI (US)

(73) Assignee: Perceptron, Inc., Plymouth, MI (US)

( * ) Notice: Subject to any disclaimer, the term of this patent is extended or adjusted under 35 U.S.C. 154(b) by 54 days.

(21) Appl. No.: 09/761,128

(22) Filed: Jan. 16, 2001

Related U.S. Application Data

(63) Continuation-in-part of application No. 09/378,451, filed on Aug. 20, 1999, now Pat. No. 6,285,959, which is a continuation-in-part of application No. 09/073,205, filed on May 4, 1998, now Pat. No. 6,134,507, which is a continuation-in-part of application No. 09/030,439, filed on Feb. 25, 1998, now Pat. No. 6,128,585, which is a continuation of application No. 08/597,281, filed on Feb. 6, 1996, now Pat. No. 5,748,505.

(51) Int. Cl.⁷ .............................................. G01B 11/03
(52) U.S. Cl. ..................... 702/104; 702/94; 702/95; 356/152.3
(58) Field of Search ..................... 702/94, 95, 104, 702/150–153, 182–185, FOR 131; 700/258, 259, 302, 303; 382/103, 151; 356/152.2, 152.3

(56) References Cited

U.S. PATENT DOCUMENTS 5,784,282 A * 7/1998 Abitbol et al. .............. 700/259

* cited by examiner

*Primary Examiner*—Kamini Shah
(74) *Attorney, Agent, or Firm*—Harness, Dickey & Pierce, P.L.C.

(57) ABSTRACT

A calibration system is provided for calibrating a sensor with respect to an external reference frame associated with manufacturing gauging station. A target calibration device is positioned at a vantage point to detect and calibrate its reference frame in relation to the external reference frame. A reference target having at least three non-coplanar reflective surfaces is illuminated by the structured light emanating from the sensor. In this way, the calibration system is able to determine the spatial location and orientation of the reference target in relation to the sensor. The calibration system further includes a coordinate transformation system for coordinating the measurement data from the target calibration device and from the feature sensor, whereby the feature sensor is calibrated with respect to the external reference frame.

27 Claims, 5 Drawing Sheets

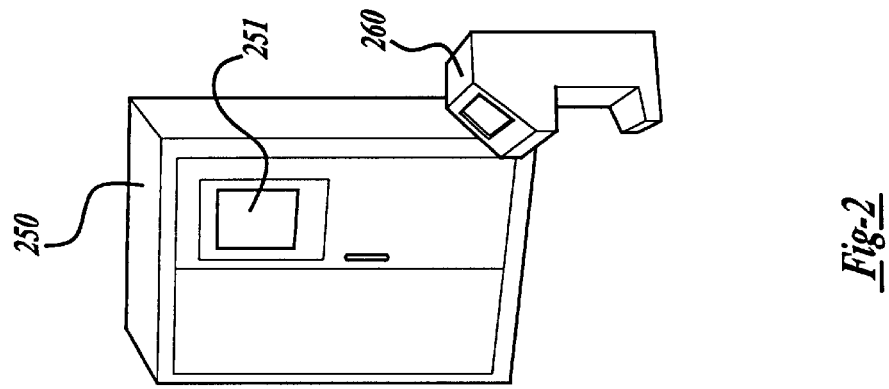
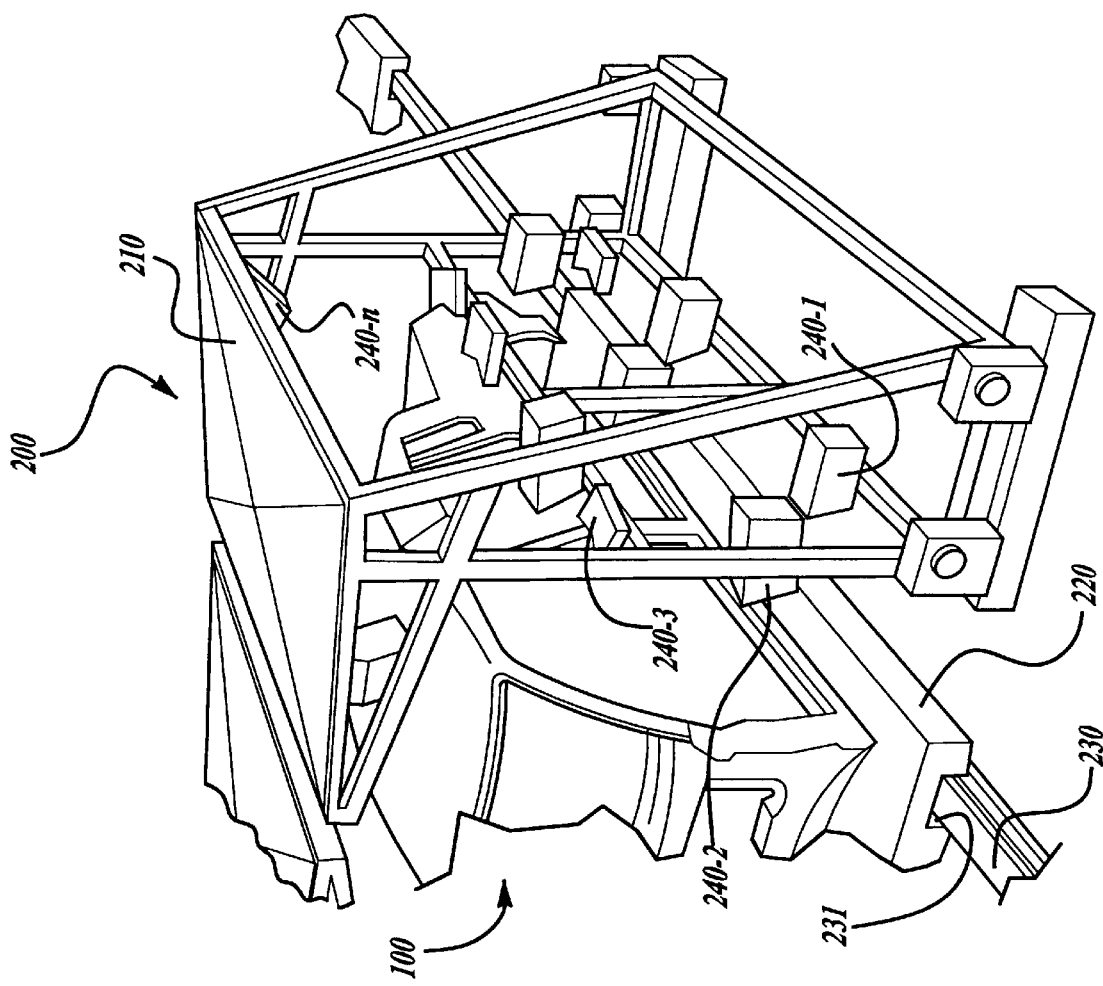
Fig-2

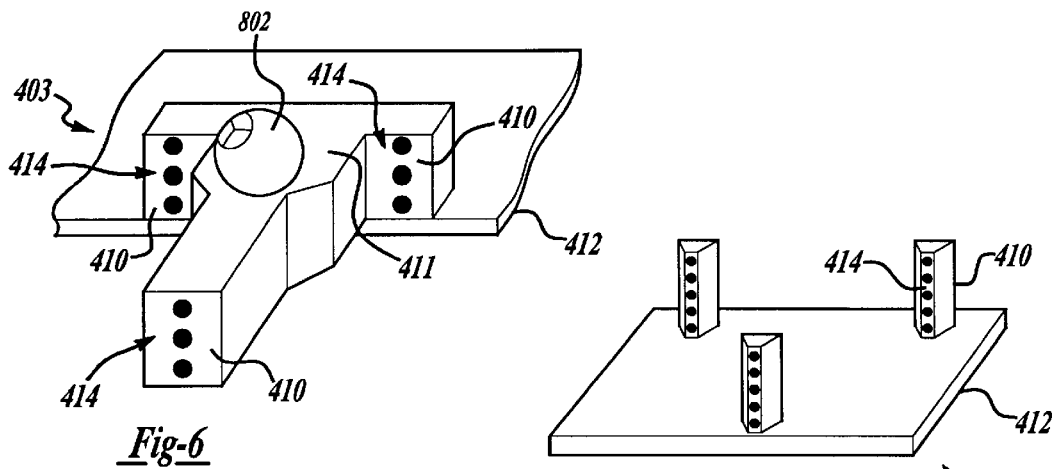
Fig-6
Fig-5
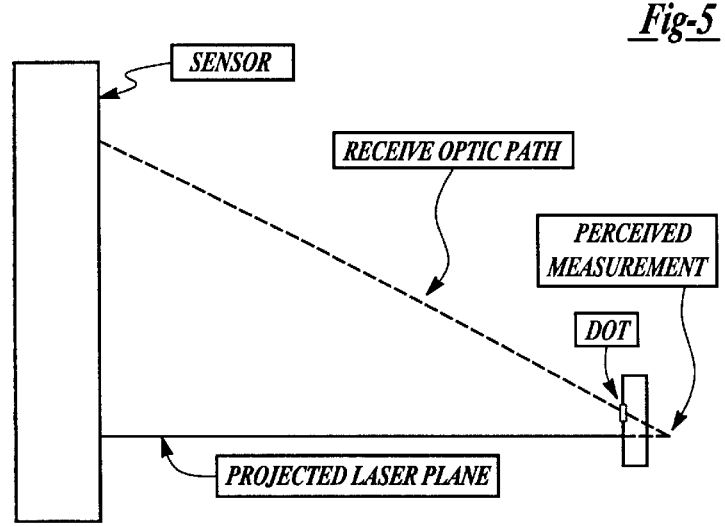
Fig-7
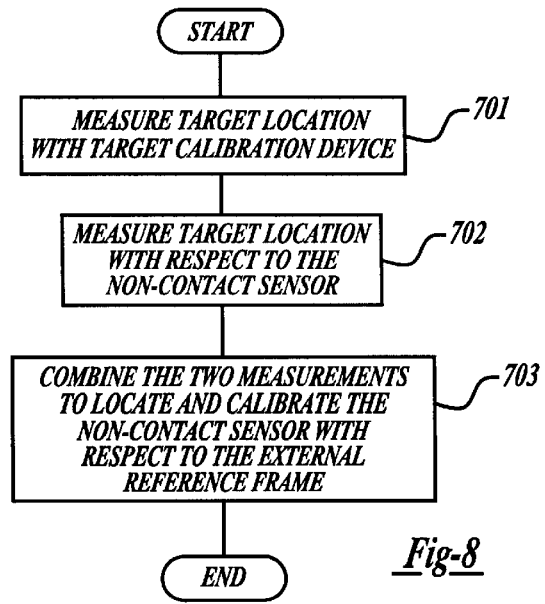
Fig-8

METHOD AND APPARATUS FOR CALIBRATING A NON-CONTACT GAUGING SENSOR WITH RESPECT TO AN EXTERNAL COORDINATE SYSTEM

CROSS-REFERENCE TO RELATED APPLICATION

This is a continuation-in-part of U.S. patent application Ser. No. 09/378,451 filed Aug. 20, 1999 entitled "Method and Apparatus for Calibrating a Non-Contact Gauging Sensor with Respect to an External Coordinate System" now U.S. Pat. No. 6,285,959 B1issued on Sep. 4, 2001, which is a continuation-in-part of U.S. patent application Ser. No. 09/030,439 filed Feb. 25, 1998 now U.S. Pat. No. 6,128,585, which is a continuation-in-part of U.S. patent application Ser. No. 09/073,205 filed May 4, 1998 now U.S. Pat. No. 6,134,507, which is a continuation of U.S. patent application Ser. No. 08/597,281 filed on Feb. 6, 1996, now U.S. Pat. No. 5,748,505 issued May 5, 1998, each of which are assigned to the assignee of the present invention.

BACKGROUND AND SUMMARY OF THE INVENTION

The present invention relates generally to non-contact gauging systems. More particularly, the invention relates to an apparatus system and method for calibrating non-contact gauging systems.

Demand for higher quality has pressed manufacturers of mass produced articles, such as automotive vehicles, to employ automated manufacturing techniques that were unheard of when assembly line manufacturing was first conceived. Today, robotic equipment is used to assemble, weld, finish, gauge and test manufactured articles with a much higher degree of quality and precision than has been heretofore possible. Computer-aided manufacturing techniques allow designers to graphically conceptualize and design a new product on a computer workstation and the automated manufacturing process ensures that the design is faithfully carried out precisely according to specification. Machine vision is a key part of today's manufacturing environment. Machine vision systems are used with robotics and computer-aided design systems to ensure high quality is achieved at the lowest practical cost.

Achieving high quality manufactured parts requires highly accurate, tightly calibrated machine vision sensors. Not only must a sensor have a suitable resolution to discern a manufactured feature of interest, the sensor must be accurately calibrated to a known frame of reference so that the feature of interest may be related to other features on the workpiece. Without accurate calibration, even the most sensitive, high resolution sensor will fail to produce high quality results.

In a typical manufacturing environment, there may be a plurality of different non-contact sensors, such as optical sensors, positioned at various predetermined locations within the workpiece manufacturing, gauging or testing station. The workpiece is placed at a predetermined, fixed location within the station, allowing various predetermined features of the workpiece to be examined by the sensors. Preferably, all of the sensors are properly positioned and should be carefully calibrated with respect to some common fixed frame of reference, such as a common reference frame on the workpiece or at the workstation.

Maintaining sensors which are properly positioned and calibrated presents several challenges. In a typical manufacturing environment sensors and their associated mounting structures may get bumped or jarred, throwing the sensor out of alignment. Also, from time to time, a sensor needs to be replaced, almost certainly requiring reorienting and recalibrating. Quite simply, sensor positioning, alignment and calibration requires careful attention in the typical manufacturing plant.

Proper sensor positioning, alignment and calibration can present significant time and labor requirements. For a given part or assembly, the entire manufacturing assembly line may need to be shut down and the workstation cleared, so that the sensor may be positioned, aligned and recalibrated. In some instances this entails placing a highly accurate, and very expensive full-scale model of the part or assembly into the workstation. This independently measured part is sometimes called a master part. The master part is placed in careful registration with the external coordinate system of the workstation and then each sensor is trained on its assigned feature (such as a hole or edge). Once positioned, the sensors are locked into place and calibrated and the master part is removed. Only then can the assembly line be brought back online.

As an alternative to using a master part, it is possible to calibrate the gauging sensor by attaching a target to the sensor and illuminating the target using a plane of structured light produced by the sensor. A pair of optical sighting devices, such as theodolites, are placed at different vantage points within the workspace. The theodolites triangulate on the illuminated target to provide an independent reading of the position of the target. The theodolites are placed at carefully prescribed locations relative to an external reference frame. With the gauging sensor projecting structured light onto the target, the theodolites are manually aimed at the illuminated targets and readings are taken. The respective readings of the theodolites and the gauging sensor are coordinated and translated to calibrate the sensor relative to the external reference frame. It is a trial and error process. If the sensor needs to be reoriented (as is often the case), the theodolites must be manually retrained on the target after each sensor position adjustment. For more information on this calibration technique, see U.S. Pat. No. 4,841,460 to Dewar et al.

Whereas both of the aforementioned calibration techniques do work, there is considerable interest in a calibration technique that is more efficient and easier to accomplish, and which eliminates the need to rely on expensive master parts. To this end, the present invention provides a calibration system that can be used in a matter of minutes, instead of hours, and without the need for precisely manufactured master parts. One of the major advantages of the invention is that it allows the calibration of the sensors to be checked or realigned between line shifts, without requiring the line to be shut down for an extended period.

The calibration system employs reference indicia that are disposed in fixed relation to the external reference frame of the manufacturing or assembly zone or gauging station. A target calibration device is positioned at a vantage point, typically above the gauging station, so that the reference indicia are within the field of view of the target calibration device. The target calibration device is operative to determine the spatial location and orientation of a portable reference target within the gauging station. Exemplary target calibration devices may include, but are not limited to a photogrammetry system, a theodolite system, or a laser tracker system.

The calibration system further employs a portable reference target that is placed within the observation field of the target calibration device and also within the sensing zone of the feature sensor. The presently preferred portable reference target is a three-dimensional framework that provides at least three non-coplanar reflective structures (e.g., straight edges) that can be illuminated by structured light emanating from the feature sensor. As part of the present invention the feature sensor includes, but is not limited to, a structured light triangulation sensor. Although the non-coplanar reflective structures provide the feature sensor with spatial data for measuring the position and orientation of the portable reference target, the present invention improves the accuracy of the measurement data by adapting the target to support a visible dot pattern or a light sensitive imaging array device (e.g., CCD). In this way, the portable reference target provides unambiguous spatial data for measuring its spatial position and orientation.

The calibration system further includes a coordinate transformation system for coordinating the measurement data from the target calibration device and from the feature sensor. More specifically, the calibration system is adapted to collect data from the target calibration device and the feature sensor. The transformation system establishes a first relationship between the reference frame of the target calibration device and the external reference frame. The transformation system also establishes a second relationship between the reference frame of the target calibration device and the reference frame of the feature sensor. Finally, the transformation system determines a third relationship between the reference frame of the feature sensor and the external reference frame, whereby the feature sensor is calibrated with respect to the external reference frame.

The system and technique of the present invention allows for simplified calibration of a feature sensor. The target calibration device is first calibrated via the reference indicia to the external reference frame. Next, the portable reference target is placed within the field of view of the target calibration device and the feature sensor. The portable reference target is calibrated with respect to the reference frame of the target calibration device. The feature sensor is then calibrated by projecting structured light from the feature sensor onto the portable reference target. The structured light intersects the target, producing reflected light patterns at the edges of the target that are then read by the feature sensor. The coordinate transformation system simultaneously receives measurement data as to where the structured light strikes the dot patterns or the light sensitive imaging array devices associated with the target. The coordinate transformation system then performs the appropriate coordinate transformation to map the data of the feature sensor back to the external reference frame. The entire calibration sequence can be performed quite quickly.

For a more complete understanding of the invention, its objects and advantages, reference may be had to the following specification and to the accompanying drawings.

BRIEF DESCRIPTION OF THE DRAWINGS

FIG. 2 is a perspective view of a typical gauging station on an automotive assembly line, including a plurality of non-contact feature sensors to be calibrated in accordance with the principles of the invention;

FIG. 5 is a perspective view of a second alternative embodiment of the portable reference target body in accordance with the present invention;

FIG. 6 is a perspective view of a third alternative embodiment of the portable reference target in accordance with the present invention;

FIG. 7 is a diagram showing the how the location of the visible dot on the reference target may be determined by the feature sensor in accordance with the present invention;

FIG. 8 is a flowchart further illustrating the calibration method of the present invention;

DETAILED DESCRIPTION OF THE PREFERRED EMBODIMENT

Figure 1:
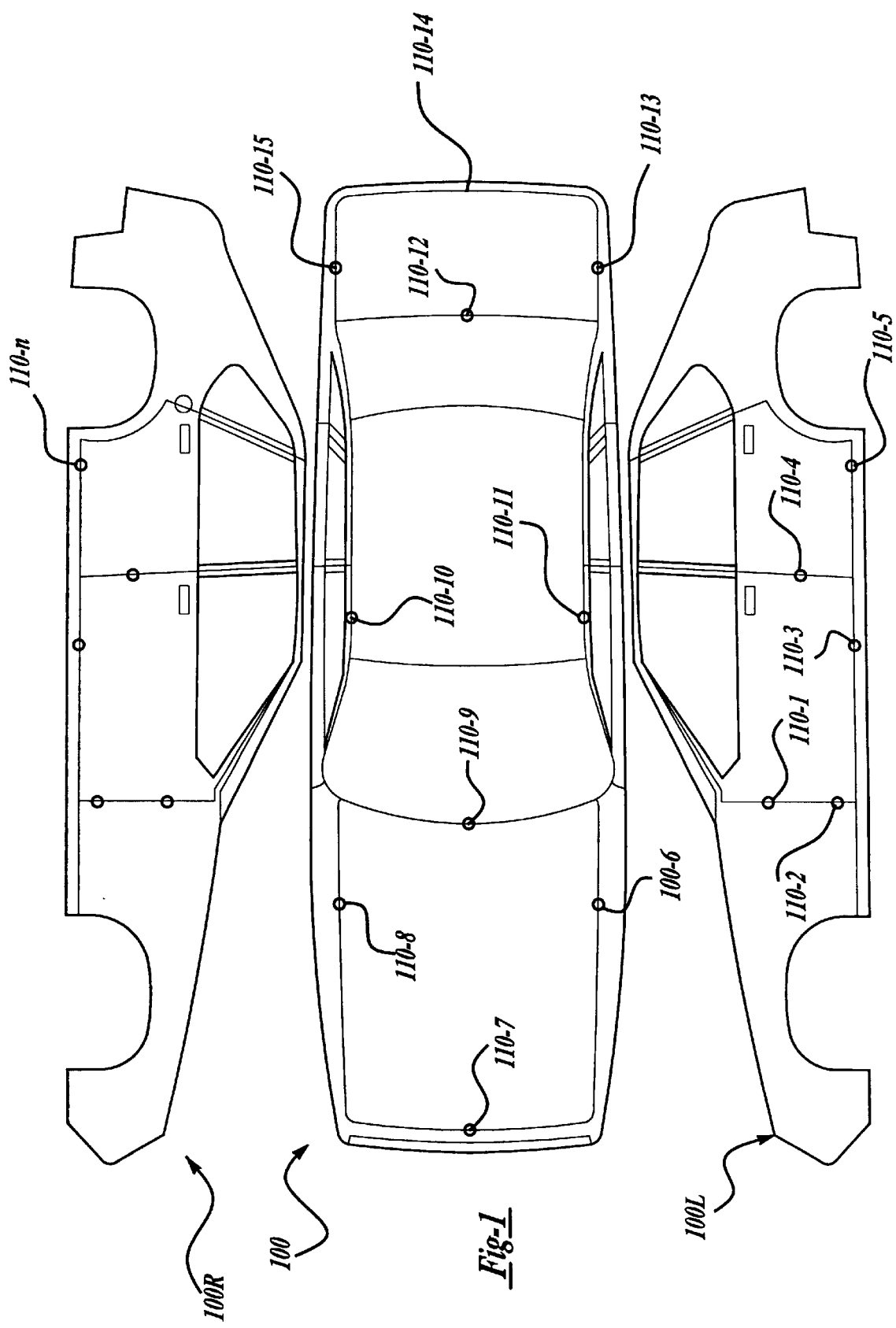
FIG. 1 is a simultaneous top and side view of a portion of an automotive vehicle body, showing typical points of interest which would be placed in the field of view of a plurality of non-contact feature sensors at a gauging station.

With reference to FIG. 1, there is shown a typical automotive vehicle body portion which, prior to its assembly with other of the vehicle components, would require gauging of certain key points. Such miscellaneous points of interest on workpiece 100 of FIG. 1 are shown as points 110-1 through 110-n. The left side 100L of the vehicle body and the right side 100R of the vehicle body are shown in an "unfolded" view for convenience in FIG. 1. Typical usage of the points or the manner in which they are selected would be dictated, for example, by the ensuing assembly process to take place with respect to the workpiece 100. For example, assume that the hood has not yet been assembled over the hood cavity at the front of the vehicle. Then measurements about the periphery of the hood cavity, such as at points 110-6, 110-7, 110-8 and 110-9 could be made to determine whether the ensuing assembly of the hood lid to the vehicle body can be performed with an acceptable fit between the parts to be assembled.

While there are many sensor arrangements known, including the optical arrangement disclosed in U.S. Pat. No. 4,645,348 to Dewar et al., assigned to the assignee of the present invention, it has been time consuming to calibrate the sensor readings at all the desired points of interest about a large workpiece with respect to any desired external reference frame. The present invention addresses the need for faster calibration.

A typical gauging station for an automotive vehicle part as shown in FIG. 1 could take the form shown in FIG. 2. Workpieces to be gauged at gauging station 200 rest on transporting pallets 220, which are moved along an assembly line via pallet guides 230 that pass through guide channels 231 in the pallet. At the gauging station 200, a sensor mounting frame 210 (only one half of which is shown in perspective in FIG. 2) surrounds the workpiece 100 to be gauged and provides a plurality of mounting positions for a series of optical gauging sensors or non-contact feature sensors 240-1 through 240-n, each designed in accordance with the disclosure of U.S. Pat. No. 4,645,348, for example. Communication cables which are not specifically shown in FIG. 2 for clarity, couple the sensors 240 to a machine vision computer 250 which includes a CRT or cathode ray tube display 251. Optionally provided with a typical machine vision computer is a printer 260. The apparatus and method of this invention may be used to effect calibration of each of the non-contact sensors 240 with respect to a predetermined external coordinate system or reference frame, associated, for example, with the workpiece 100 to be measured or with respect to an external reference frame associated with the gauging station itself.

Figure 3:
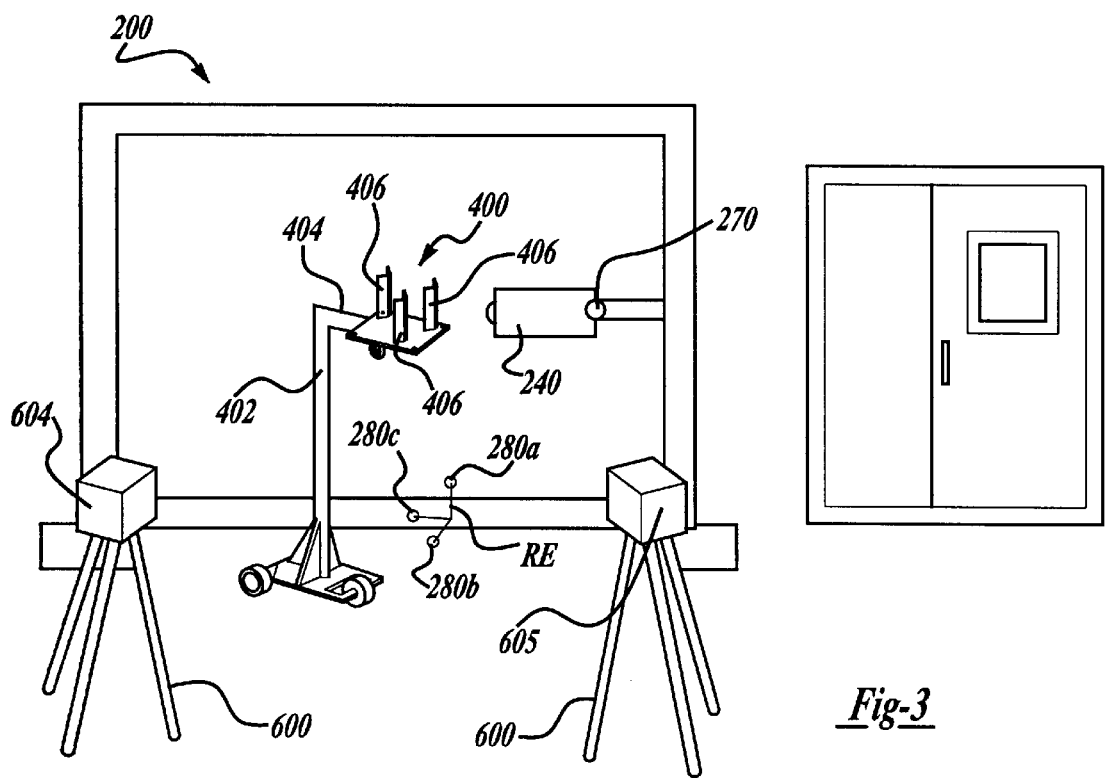
FIG. 3 is a side elevational view of a calibration system in accordance with the teachings of the present invention.

Referring to FIG. 3, gauging station 200 is shown in conjunction with the calibration system of the present invention. To simplify the illustration, only one feature sensor 240 has been illustrated. As part of the present invention the feature sensor 240 includes, but is not limited to, a structured light triangulation sensor. The feature sensor 240 is adjustably secured to the gauging station frame at 270, thereby allowing the feature sensor 240 to be positionally adjusted and then tightened or locked into place once it is properly aimed at the point in space (x, y, z) where the workpiece feature of interest will be located and is properly oriented at the correct attitude (pitch, yaw and roll). The non-contact feature sensor 240 includes a sensing zone and an associated sensor reference frame and coordinate system.

The calibration system of the present invention also includes a portable reference target 400. The portable reference target 400 can be mounted on any suitable fixture, allowing it to be positioned in front of the feature sensor 240 for the calibration operation. In this case, the portable reference target 400 is shown attached to a simple tripod stand 402 with cantilevered arm 404. It is envisioned that other support structures may be used within the scope of the present invention. The portable reference target 400 is further defined as a three-dimensional framework that provides at least three non-coplanar reflective members 406 that may be illuminated by the structured light emanating from the feature sensor 240. Although the non-coplanar reflective members 406 provide the feature sensor 240 with spatial data for measuring the position and orientation of the portable reference target 400, the accuracy of the measurement data is improved by adapting the portable reference target 400 to support light sensitive imaging array devices or passive reflective dots.

Figure 4:
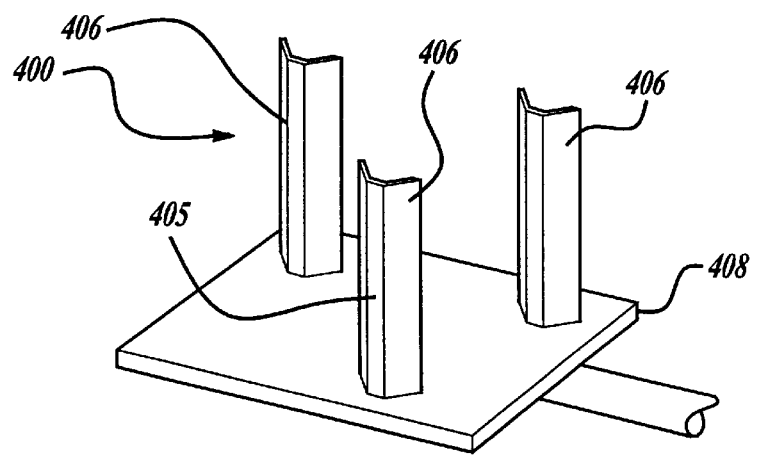
FIG. 4 is perspective view of a portable reference target body in accordance with one embodiment of the present invention which employs imaging array CCD devices.

Referring to FIG. 4, one type of portable reference target 400 is comprised of at least three upright corner members 406 coupled to a planar base 408. An outer corner edge 405 of each member 406 serves as a reflective surface for the structured light plane from the feature sensor 240. A light-sensitive charge coupled device (CCD) or other light sensitive imaging array device is aligned along the outer corner edge 405 of each member 406. In this way, the CCDs provide location data as to where the structured light from the non-contact sensor 240 strikes each of the corner members 406 on the portable reference target 400. It is envisioned that the CCD is a 1×N (linear) device, where N is selected to provide suitable resolution (e.g., 4096 pixels). One skilled in the art will readily recognize from such discussions that other geometric configurations providing at least three non-coplanar reflective surfaces may be used for the portable reference target.

Referring back to FIG. 3, the calibration system further includes a target calibration device 600 which may be positioned at a convenient vantage point, such as above the space that is occupied by the workpiece in the gauging station 200. Alternatively, the target calibration device 600 can be temporarily positioned in a fixed location, such as by hanging it from the gauging station frame or mounting it on a movable stand, allowing the target calibration device 600 to be moved from location to location throughout the manufacturing facility.

According to one aspect of the present invention, a photogrammetry system 600 serves as the target calibration device. Photogrammetry systems work on well known principles of using dots or points of light as photogrammetry targets. In general, at least two cameras 604, 605 that are calibrated as a pair can be used to measure the photogrammetry targets in a three-dimensional coordinate frame. The photogrammetry system 600 can measure the XYZ coordinates of at least three non-collinear points with known coordinates affixed to the portable reference target 400, thus creating a full six-degree-of-freedom link between the feature sensor 240 and the photogrammetry system 600. It should be noted that some commercially available photogrammetry systems can provide fast enough response times to provide real-time position feedback of the sensor. An exemplary photogrammetric camera is the ProReflex Motion Capture System manufactured by Qualisys AB of Savedalen, Sweden or the Metronor System manufactured by Metronor ASA of Nesbru, Norway.

The two photogrammetric cameras 604, 605 are positioned at a convenient vantage point, such as above and/or adjacent to the space that is occupied by the workpiece in the gauging station 200. A plurality of non-colinear photogrammetry targets (not specifically shown) are also incorporated into the base of the portable reference target 400. In the presently preferred embodiment, light-emitting diodes (LEDs) serve as the photogrammetry targets. Although simple switched LED devices are easy to implement and therefore presently preferred, other types of active or passive (e.g., dots, holes or retro-reflectors) photogrammetry targets may be used in the present invention. It is further envisioned that a series of dots aligned on the upright members of the portable reference target (as described below) may also serve as the photogrammetry targets. As long as the portable reference target 400 is within the field of view of the photogrammetric cameras 604, 605, the photogrammetric cameras will provide an accurate determination of the position of the portable reference target 400. More specifically, three or more non-collinear photogrammetry target measurements will yield a six degree-of-freedom location and orientation of the portable reference target 400.

To illustrate the principals of the invention, it will be assumed that the feature sensor 240 is to be calibrated with respect to an external frame of reference associated with the stationary gauging station 200. In this regard, external reference frame RE has been diagrammatically included in FIG. 3. A plurality of non-colinear reference indicia 280a, 280b, and 280c are incorporated into the structure of the gauging station 200.

With reference to FIG. 6, a second alternative preferred embodiment for the portable reference target 401 uses a series of dots 414 in place of each light sensitive imaging array device. The portable reference target 403 is generally a three-dimensional framework that provides at least three non-coplanar reflective surfaces. In particular, the framework is comprised of at least three upright members 410 which are coupled to a planar base 412. The series of visible dots 414 are aligned vertically along the surface of each upright member 410. It is envisioned that the visible dots 414 may be active (e.g., light emitting diodes) or passive (dots, holes or retro-reflectors).

A third alternative preferred embodiment of the portable reference target 403 is shown in FIG. 6. Again, the portable reference target body 403 utilizes a series of visible dots 414 in place of each light sensitive imaging array device. The portable reference target 403 is also a three-dimensional framework that provides at least three non-coplanar reflective surfaces. In this case, the framework is comprised of at least three upright surfaces 410 formed on a solid T-shaped body 411. The body 411 is then secured to a planar base 412. A series of visible dots 414 are aligned vertically along each upright surface 410. The visible dots 414 are preferably passive black dots against a white background. However, the visible dots 414 may also be other types of passive shapes including holes or retroreflectors, or may be active devices such as light emitting diodes. To the extent that the target calibration device is a laser tracker, a retroreflector 802 may be mounted to the top surface of the T-shaped body. However, the retroreflector 802 may also be mounted to other locations of the portable reference target 401.

In operation, the portable reference targets 401, 403 are illuminated by the structured light emanating from the non-contact feature sensor 240. In the case of passive visible dots or holes, an auxiliary light may be used to illuminate the visible dots 414 or holes above and below the laser line. The calibration system which operates the feature sensor 240 is able to calibrate the feature sensor 240 based on the spatial location of the visible dots 414 on the portable reference target 401, 403. The emanating structured light from the sensor may strike the area between two dots 414 on an upright member 410. One type of non-contact feature sensor 240 is designed to only perform measurements within the structured light plane, so in this case a correction is needed. Even though a dot 414 does not lie in the measurement plane of the sensor 240, it appears in the plane as shown in FIG. 7. In this case, a simple geometric projection is performed in three dimensional space to determine the physical location of the visible dot 414, and therefore determine the location of the portable reference target 401, 403 relative to the feature sensor 240.

Referring to FIG. 8, the calibration technique of the present invention will now be described. First, the target calibration device 600 is calibrated to the external reference frame so that the exact location of the it is known within the external reference frame. This location is then stored in a memory. A coordinate transformation system connected to the target calibration device can be used for this step. Preferably, the coordinate transformation system is a processor forming part of the machine vision computer 250 of FIG. 2. At step 701, the portable reference target 400 is placed within the calibration field of the target calibration device. The target calibration device 600 then establishes a relationship between the portable reference target 401 and the reference frame of the target calibration device 600.

Next, at step 702, the feature sensor 240 projects structured light onto the portable reference target 400 and collects reflected light data from the portable reference target 400. As previously described, the position of the upright surfaces are ascertained and then used to describe the spatial position of the portable reference target 400 in the reference frame of the non-contact feature sensor 240. In order to determine the orientation of the portable reference target 400, the calibration system of the present invention simultaneously collects data from the non-contact feature sensor 240 and the target calibration device 600. In the case of the first embodiment of the reference target, the calibration system also collects data from the imaging array devices on the reference target. At step 703, measurement data is combined in order to locate and calibrate the non-contact sensor 240 with respect to the external reference frame. Once this data is collected, the feature sensor 240 is then partially calibrated with respect to the fixed reference frame $R_F$. It will be necessary to repeat this measurement at preferably four different locations within the sensor field of view to determine complete position and orientation of the non-contact feature sensor 240 with respect to the external reference frame and coordinate system. The above steps for determining complete position and orientation of the non-contact feature sensor 240 can be performed by the processor executing the coordinate transformation system.

In the foregoing example, the target calibration device 600 was calibrated first, the position of the portable reference target 401 was calibrated second, and the non-contact feature sensor 240 was calibrated third. It is envisioned that these operations could be performed in a different sequence and thereby achieve the same end result.

Figure 9:
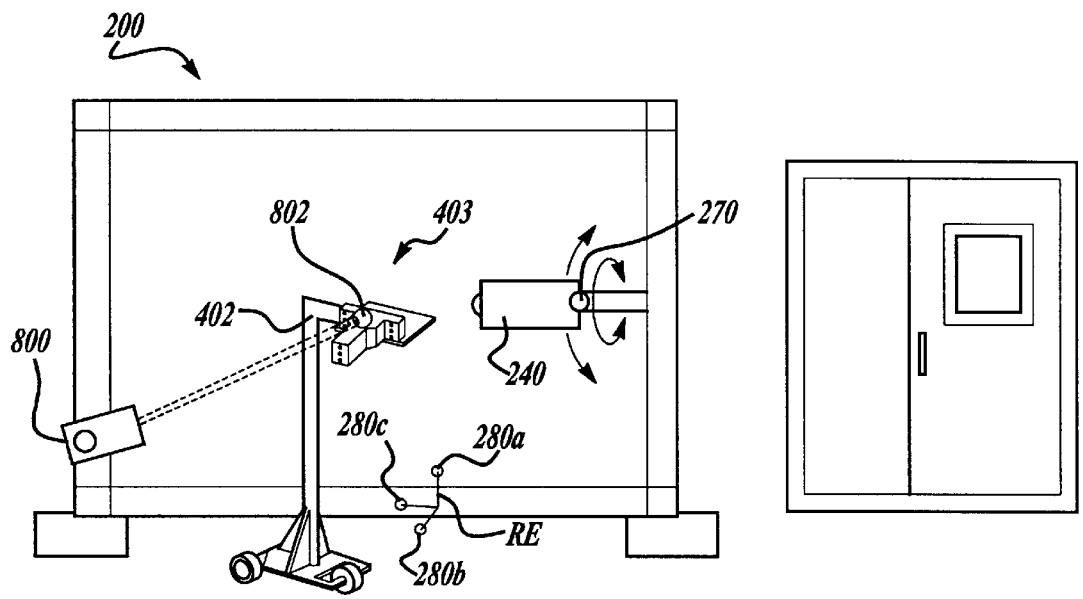
FIG. 9 is a perspective view of a preferred embodiment of the present invention which employs a laser tracker system as the target calibration device.

In addition to the photogrammetry system, other target calibration devices may be used in conjunction with the calibration system of the present invention. In an alternative embodiment, a servo driven laser tracker serves as the target calibration device. Referring to FIG. 9, a servo driven laser tracker 800 may be positioned at a convenient vantage point in the gauging station, such as above the space that is occupied by the workpiece. Alternatively, the laser tracker can be temporarily positioned at a location within the gauging station, such as by hanging it from the gauging station frame or mounting it on a movable stand.

The servo driven laser tracker 800 emits an outgoing laser beam and detects an incoming laser beam. The laser tracker 800 includes a servo drive mechanism with closed loop controller that points the laser tracker in the direction of the incoming beam as reflected by a retroreflector 802. As long as the laser tracker is within the 45–60° field of view of the retroreflector, the laser tracker 800 will precisely follow or track the position of the retroreflector 802. In the present invention, the retroreflector is preferably affixed to the top surface of the reference target 403. Thus, the laser tracker system can precisely track where the center of the retroreflector is at all times, even as the retroreflector is moved around within the gauging station.

In operation, the servo system and closed loop controller of the laser tracker provides a signal indicative of the line of sight through the center of the retroreflector and suitable interferometer measurements can be used to accurately ascertain the distance between the center of the retroreflector and the laser tracker. However, the laser tracker provides only a partial link to the external reference frame. It will generate the X, Y, Z position of the retroreflector. In order to acquire all six degrees-of-freedom (X, Y, Z as well as roll, pitch, yaw) the reference target may be moved to three or more locations while acquiring data. Preferably, four or more non-collinear location points are used. Once this has been done the data may be used to triangulate onto a six degree-of-freedom location and orientation for the reference target. Additional information for using a laser tracker system with this calibration technique can be found in U.S. patent application Ser. No. 09/030,439 filed Feb. 25, 1998 entitled "Method and Apparatus for Calibrating a Non-Contact Gauging Sensor with Respect to an External Coordinate System", which is herein incorporated by reference.

In another preferred embodiment, a theodolite system 900 serves as the target calibration device. A theodolite system 900 is a commercially available survey instrument system for measuring horizontal and vertical angles, similar in principle to the transit. The fundamental mathematical principle of operation of the theodolites is based on triangulation, such that theodolites are able to measure both horizontal and vertical angles to a selected target. An exemplary theodolite system for use with this invention may include a T105 Theodolite heads from Leica supported by a PC running Axyz software.

Figure 10:
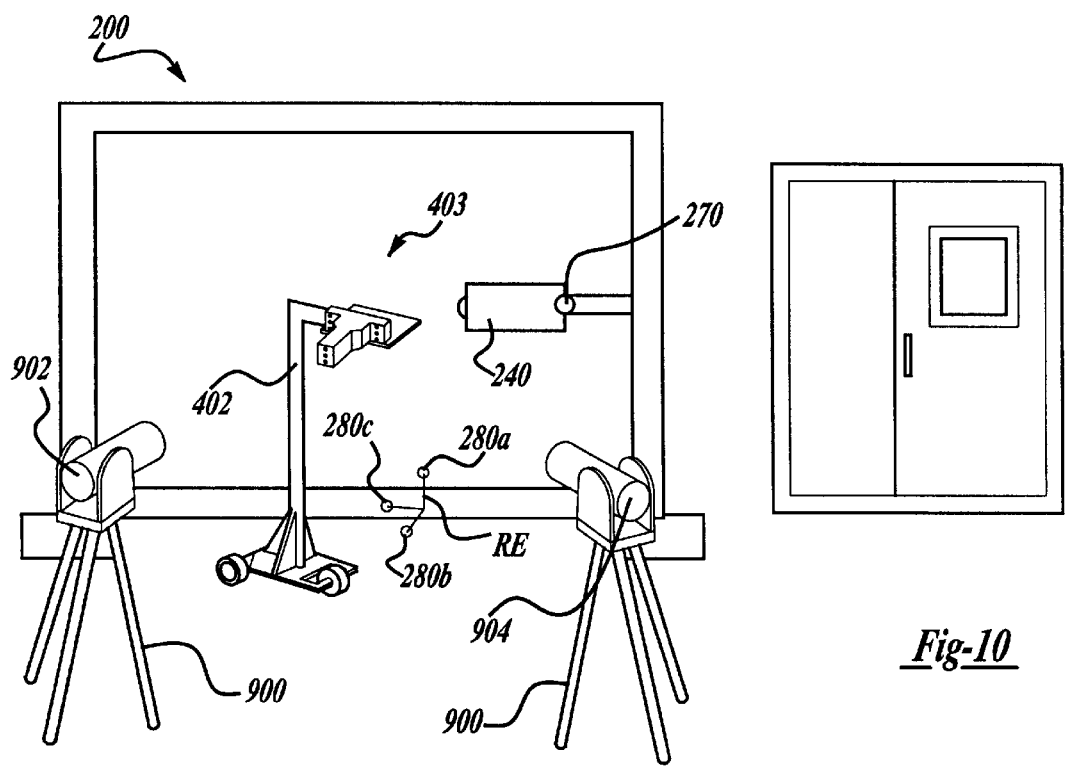
FIG. 10 is a perspective view of an alternative preferred embodiment of the present invention which employs a theodolite system as the target calibration device.

As shown in FIG. 10, at least two theodolite devices 902 and 904 are positioned at a convenient vantage points in the space that is occupied by the workpiece in the gauging station 200. While not specifically shown, a plurality of non-colinear theodolite observable targets are incorporated into the base of the portable reference target 401. These theodolite observable targets may include scribe marks, stick-on dots, machined holes or other well known types of theodolite observable targets. Again, as long as the reference target 401 is within the field of view of the theodolite devices 902, 904, an accurate determination of the position of the reference target 401 is provided by the theodolite system 900. Using two theodolite devices 902, 904, at least three or more non-collinear theodolite observable target measurements must be taken by each theodolite device in order to determine a six degree-of-freedom location and orientation of the portable reference target 401. The calibration system of the present invention otherwise operates in accordance with the previously described embodiments for either of these alternative target calibration devices.

Although the above target calibration devices are presently preferred, this is not intended as a limitation on the broader aspects of the invention. On the contrary, it is envisioned that a commercially available portable measurement arm may also be used as the target calibration device. In this case, the reference target is coupled to an end effector of the arm. Since the arm is a six degree-of-freedom measuring tool, the calibration system can deduce the actual position of the sensor as its positioned by the measurement arm. An exemplary measurement arm is manufactured by Romer of Carlsbad, Calif.

While the invention has been described in its presently preferred form, it will be understood that the invention is capable of modification without departing from the spirit of the invention as set forth in the appended claims.

What is claimed is:

1. A sensor calibration system for calibrating a non-contact sensor with respect to an external reference frame, the non-contact sensor of the type having a sensing zone associated with a sensor reference frame, comprising:
   a target calibration device having a calibration field of observation associated with a calibration device reference frame;
   a reference target for placement within the observation field of said target calibration device and within the sensing zone of said feature sensor, said reference target having at least three non-coplanar reflective surfaces;
   a reference indicia disposed in fixed relation to said external reference frame, such that the target calibration device is positionable at vantage point where the reference indicia is within the calibration field;
   a coordinate transformation system being adapted for coupling to said target calibration device for collecting data from said reference indicia and for establishing a first relationship between the calibration device reference frame and external reference frame;
   said coordinate transformation system further being adapted for coupling to said target calibration device and to said feature sensor for collecting data from the reference target and for establishing a second relationship between the calibration device reference frame and the feature sensor reference frame; and
   said coordinate transformation system determining a third relationship between the external reference frame and the feature sensor reference frame, whereby the feature sensor is calibrated with respect to the external reference frame.

2. The calibration system of claim 1 wherein each reflective surface of the reference target being adapted to support an imaging array.

3. The calibration system of claim 2 wherein the feature sensor is an active optical sensor that emits structured light and each imaging array is operable to detect the structured light from the feature sensor, thereby determining the location of the reference target in relation to the feature sensor.

4. The calibration system of claim 1 wherein each reflective surface member having a series of visible dots aligned along the reflective surface.

5. The calibration system of claim 4 wherein the feature sensor is an active optical sensor that emits structured light and detects reflected light, such that the feature sensor is operable to determine the location of at least one of the visible dots on each reflective surface and thereby determine the location of the reference target in relation to the feature sensor.

6. The calibration system of claim 1 wherein said target calibration device is further defined as a laser tracker.

7. The calibration system of claim 6 wherein said reference target further includes a retroreflector affixed to the reference target.

8. The calibration system of claim 7 wherein said laser tracker tracks a center position of said retroreflector in at least three non-colinear location, thereby establishing said second relationship between the calibration device reference frame and the feature sensor reference frame.

9. The calibration system of claim 1 wherein said target calibration device is further defined as at least two photogrammetric cameras being positionable at two or more vantage points such that said reference indicia is within the calibration field.

10. The calibration system of claim 9 wherein said reference target further includes a plurality of photogrammetry targets.

11. The calibration system of claim 10 wherein said photogrammetric cameras measure a position of said reference target in at least two non-collinear location, thereby establishing said second relationship between the calibration device reference frame and the feature sensor reference frame.

12. The calibration system of claim 1 wherein said target calibration device is further defined as at least two theodolite devices being positionable at two or more vantage points such that said reference indicia is within the calibration field.

13. The calibration system of claim 12 wherein said reference target further includes a plurality of theodolite targets.

14. The calibration system of claim 13 wherein said theodolite devices measure a position of said reference target in at least three locations, thereby establishing said second relationship between the calibration device reference frame and the feature sensor reference frame.

15. The calibration system of claim 1 further comprising a gauging station for gauging a workpiece, said feature sensor being securely connected to said gauging station for determining positions upon said workpiece.

16. The calibration system of claim 13 wherein said workpiece is a motor vehicle.

17. The calibration system of claim 1 wherein the calibration system operates within a motor vehicle manufacturing system.

18. A method for calibrating a feature sensor with respect to an external reference frame using a target calibration device, the target calibration device having a fixed position with respect to the external reference frame according to a first relationship, comprising the steps of:

providing a reference target a reference target for placement within the observation field of said target calibration device and within the sensing zone of said feature sensor, said reference target further includes at least three non-colinear upright reflective members connected to a base;

determining a second relationship between a reference target and said external reference frame through use of the target calibration device and said reference target, said second relationship defining the position of said reference target with respect to the external reference frame;

determining a third relationship between said reference target and said feature sensor through use of said feature sensor and said reference target, said third relationship defining the position of said feature sensor with respect to the position of said reference target; and calibrating said feature sensor with respect to said external reference frame based upon said first, second, and third relationships.

19. The sensor calibration method of claim 18 wherein said second relationship defines the location and the orientation of the reference target with respect to the external reference frame.

20. The sensor calibration method of claim 18 wherein said third relationship defines the location and the orientation of the reference target with respect to the location and orientation of the feature sensor.

21. The sensor calibration method of claim 18 wherein the step of determining the third relationship further comprises:

placing said reference target within the field of view of said feature sensor;

projecting structured light from said feature sensor upon said reference target; and determining the position of said reference target with respect to said feature sensor based upon the structured light reflected to said feature sensor from said reference target.

22. The sensor calibration method of claim 18 wherein said target calibration device is further defined as a laser tracker.

23. The sensor calibration method of claim 22 wherein said reference target further includes a retroreflector affixed to the reference target.

24. The sensor calibration method of claim 23 wherein said laser trackers tracks a center position of said retroreflector in at least three non-colinear location, thereby establishing said second relationship between the calibration device reference frame and the feature sensor reference frame.

25. The sensor calibration method of claim 18 wherein said target calibration device is further defined as at least two photogrammetric cameras being positionable at two or more vantage points such that said reference indicia is within the calibration field.

26. The sensor calibration method of claim 25 wherein said reference target further includes a plurality of photogrammetry targets.

27. The sensor calibration method of claim 26 wherein said photogrammetric cameras measures a position of said reference target in at least three non-colinear location, thereby establishing said second relationship between the calibration device reference frame and the feature sensor reference frame.

* * * * *